(No Model.)

E. H. ODEND'HAL.
COFFEE POT.

No. 268,717. Patented Dec. 5, 1882.

WITNESSES:
W. W. Hollingsworth
John E. Kennon

INVENTOR:
E. H. Odendhal
BY
ATTORNEYS.

N. PETERS, Photo-Lithographer, Washington, D. C.

UNITED STATES PATENT OFFICE.

EDWARD H. ODEND'HAL, OF NORFOLK, VIRGINIA.

COFFEE-POT.

SPECIFICATION forming part of Letters Patent No. 268,717, dated December 5, 1882.

Application filed June 16, 1882. (No model.)

*To all whom it may concern:*

Be it known that I, EDWARD H. ODEND'HAL, of the city of Norfolk, in the county of Norfolk and State of Virginia, have invented a new and useful Improvement in Coffee-Pots; and I do hereby declare that the following is a full, clear, and exact description of the same, reference being had to the accompanying drawings, forming part of this specification.

This invention relates to improvements in coffee-pots, and has special relation to appliances therefor, its object being to fully extract the strength of the coffee and to free the liquid coffee or beverage of grounds or sediment.

The nature of this invention consists in the employment of a bottomless chamber or base, having tubes or pipes passing through it from a point on a plane a little above its lower end to a suitable height above it, whence they are connected to a bottomless cylinder, on which is fitted a perforated or punctured vessel or strainer, said base or chamber also having a tube arranged in its center, substantially as hereinafter more fully set forth.

Figure 1:
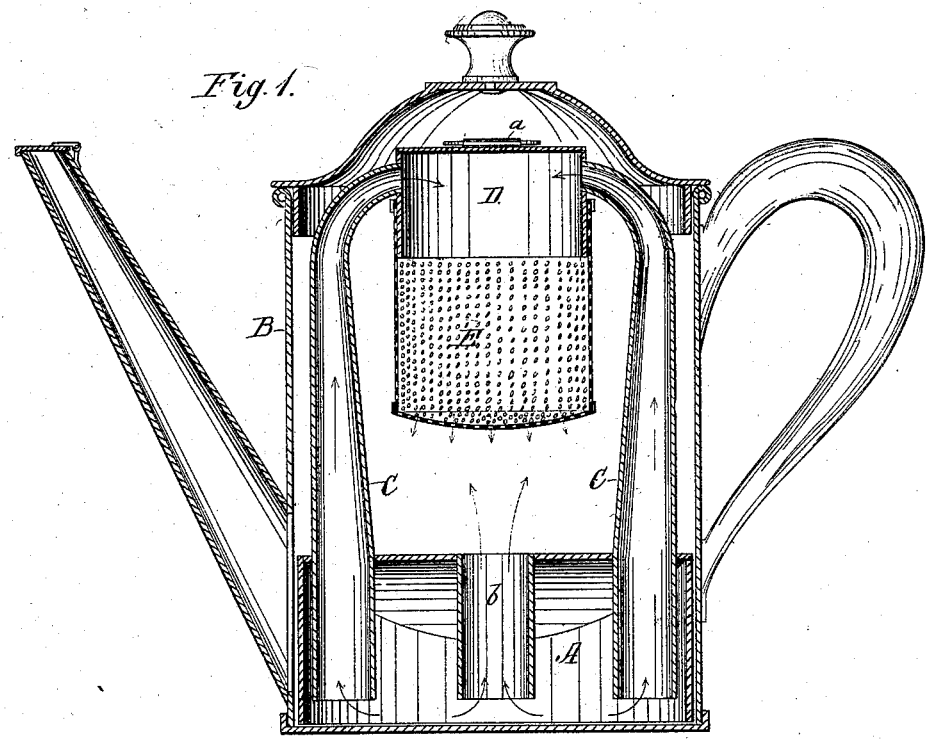
Figure 2:
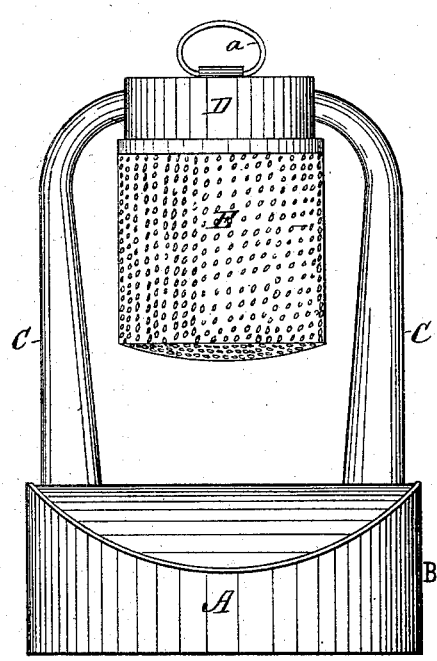

In the accompanying drawings, Figure 1 is a sectional view, showing my improvement as applied for use in a coffee-pot; and Fig. 2 is a side view of my improvement removed from the coffee-pot.

In carrying out my invention, I employ a bottomless chamber or base A, which may be a section of a cylinder, and is adapted to fit snugly or closely in the coffee-pot B and rest upon the bottom of the latter. The upper surface or top of the base A is preferably convexed or sloped to its sides.

C C are pipes or tubes, preferably of gooseneck shape, and passed through the top of the base A, to which they are fastened, from a plane a little above its lower edge to a suitable height above it. This arrangement of the lower ends of the pipes C permits the entrance of the boiling water and steam thereto. At their upper ends they enter and are connected to a bottomless chamber or cylinder, which may have an attached ring or bail, $a$, for conveniently lifting the appliance out of the coffee-pot.

$b$ is a central pipe or tube, fixed to the top of the base around an opening therein, and reaching down to the same plane occupied by the lower end of the pipes C, and for the same purpose. The purpose of this pipe is to eject the steam and boiling water against the bottom of the strainer or perforated vessel, presently described, which holds the coffee.

E is the strainer, a serially perforated or apertured vessel, adapted to tightly fit on the bottomless cylinder D, as against its becoming accidentally detached from or falling off the cylinder by the weight of its contents, but capable of being forced off said cylinder when it is desired to remove its contents. Into this strainer or vessel the coffee is placed from which it is intended to extract the strength.

It will be observed that, with the required quantity of water put into the coffee-pot, after the removal of the appliance, and the required quantity of ground coffee put into the vessel E, and then replacing the appliance, it is ready for operation. By placing the pot on the stove or other heater the steam and water in ebullition will ascend the pipes C C in a heated state and saturate the coffee in the vessel or strainer E. As the boiling water acts on the coffee its strength will be extracted, and the water be consequently converted into liquid coffee, which will pass through the vessel or strainer E into the coffee-pot. As the action of the boiling water upon the coffee in the vessel E continues, the strength of the coffee will be further extracted, which is kept up until it is fully developed. The boiling water and steam ejected up through the central pipe, $b$, into the perforated vessel E, into contact with its contents, will cause the swelling of the coffee in the latter, and the increased development of its strength.

From the foregoing it will be observed that the full strength of the coffee is extracted, while the liquid or beverage is produced free of all grounds or sediments, which are great desiderata in making coffee.

Having thus described my invention, what I claim, and desire to secure by Letters Patent, is—

In an appliance for coffee-pots, the combination, with the bottomless base or chamber, of the central pipe or tube, and the upright tubes or pipes extending from a plane a little above its lower edge and to a suitable height above it, the bottomless cylinder or chamber affixed to the upper ends of the aforesaid pipe, and the strainer or perforated vessel, substantially as and for the purpose set forth.

EDWARD H. ODEND'HAL.

Witnesses:
E. M. BAUM,
GEO. D. PARKER.